United States Patent [19]

Miyao et al.

[11] Patent Number: 5,370,887
[45] Date of Patent: * Dec. 6, 1994

[54] DYEING AGENT AND DYEING SOLUTION

[75] Inventors: Norio Miyao, Osaka; Yoshio Sawada, Fukushima; Testuya Sagoh, Nara, all of Japan

[73] Assignees: House Foods Corporation, Osaka; Sanyo Kanzume Co., Ltd., Fukushima, both of Japan

[*] Notice: The portion of the term of this patent subsequent to Aug. 24, 2010 has been disclaimed.

[21] Appl. No.: 720,728

[22] Filed: Jun. 25, 1991

[51] Int. Cl.⁵ .............................................. A23L 1/275
[52] U.S. Cl. ................................... 426/250; 426/252; 426/540
[58] Field of Search ............... 426/252, 250, 102, 103, 426/267, 262, 540

[56] References Cited

U.S. PATENT DOCUMENTS 5,238,695  8/1993  Nakaji et al. ........................ 426/250

FOREIGN PATENT DOCUMENTS 2-291242  7/1984  Japan .

OTHER PUBLICATIONS

G. G. Hawley 1981 Condensed Chemical Dictionary 10th Edition Van Nostrand Reinhold Company New York, pp. 183 and 500.

Primary Examiner—Donald E. Czaja
Assistant Examiner—Anthony Weiev
Attorney, Agent, or Firm—Oblon, Spivak, McClelland, Maier & Neustadt

[57] ABSTRACT

A dyeing agent for dyeing cherries comprises (a-1) a lac dye; (b) alum; (c) L-ascorbic acid and/or a salt thereof; and (d) at least one member selected from the group consisting of phosphoric acid, tartaric acid, citric acid and malic acid and/or a salt thereof in an amount of 0.8~6.0 parts by weight of component (b), 1.0~10.0 parts by weight of component (c) and 3~23.3 parts by weight of component (d) relative to 1 part by weight of component (a-1), or (a-2) a cochineal dye and a lac dye; (b), (c) and (d) in an amount of 0.8~3.6 parts by weight of component (b), 1.0~6.0 parts by weight of component (c) and 3~14 parts by weight of component (d) relative to 1 part by weight of component (a-2). A method for dyeing cherries comprises the steps of charging cherries to be dyed in a container together with a dyeing solution containing the dyeing agent, degassing the contents of the container, then sealing the container and heating the sealed container. Thereby, it is possible to uniformly dye cherries approximately natural red color. Thus, cherries can be dyed in high efficiency through simple processes, i.e., without using a multistage immersion treatment. Moreover, there can be obtained cherries whose texture is not softened, which are hard and tight and which exhibit favorable taste peculiar to cherries.

13 Claims, No Drawings

DYEING AGENT AND DYEING SOLUTION

BACKGROUND OF THE INVENTION

The present invention relates to a cherry-dyeing agent and a dyeing solution for use in preparing cherries or cherry bobs (hereinafter referred to as "cherries") dyed red which have widely been used as, for instance, additives for confectionery such as cakes and jellies as well as a method for dyeing cherries with the dyeing solution.

Cherries have been dyed red with a dye prior to putting on the market or the use thereof. For instance, Japanese Unexamined Patent Publication (hereinafter referred to as "J.P. KOKAI") No. Sho 53-62856 discloses a technique for dyeing cherries red approximately identical to the natural color thereof using a naturally-occurring dye. More specifically, the method comprises the steps of boiling or steaming cherries to be dyed, immersing them in a mixed system which comprises carminic acid and/or laccaic acid as dyeing agents and an aluminum salt and an organic acid and/or a salt thereof as dyeing assistants and which has a pH ranging from 4 to 7 to maintain the pH value within the foregoing range and then immersing them in an acid or an aqueous solution of a mixture of an acid and a calcium salt and/or an aluminum salt to give cherries dyed red.

However, in this method, the preliminary process for boiling or steaming cherries to be dyed and the use of two baths for the immersion treatments are required. This makes the dyeing process quite troublesome. Further, the immersion treatments must be practically continued for a long time period (in general, 2 to 3 days). This results in a decrease of the production efficiency. Moreover, the cherries are excessively heated during boiling or steaming as well as other heat-treatments and, therefore, the texture of the cherries are softened and the taste thereof is likewise impaired.

On the other hand, Lecture H "Manufacture of Canned Foods", pp. 291–294, issued on September first, Showa 44 (1969), by Canners Association of Japan discloses a method for preparing cherries preserved in syrup which comprises dyeing cherries by immersing them in a dyeing solution comprising an artificial dye and an organic acid for adjusting pH thereof to 4.5 contained in a tub or tank, rapidly cooling them, then sufficiently washing with water, canning them together with syrup, degassing the contents of the can, i.e., the cherries and the syrup, sealing the can and sterilizing the contents of the sealed can.

However, this method dyes not only the fruit portion but also the carpophore thereof, provides cherry fruits whose color is quite different from that of the natural cherry fruit and, therefore, the commercial value of the resulting cherries is substantially damaged. Moreover, this method requires the use of a multistage immersion process and a water washing process and, thus the practice of this method is quite troublesome and further the taste of the resulting dyed cherries is also greatly impaired.

SUMMARY OF THE INVENTION

Accordingly, an object of the present invention is to provide a dyeing agent and a dyeing solution which make it possible to uniformly dye cherries red which is approximately identical to that of the natural cherry fruit.

Another object of the present invention is to provide a method for dyeing cherries in which the foregoing dyeing solution is employed and which makes it possible to dye cherries clear bright red in high efficiency through a simple process, in other words without using any multistage immersion treatment.

Other objects and features of the present invention will become apparent from the following description and Examples.

The present invention has been completed on the basis of the finding that the foregoing objects of the invention can effectively be achieved by the use of specific one or two kinds of red dyes, alum, L-ascorbic acid and/or a salt thereof and a specific acid and/or a salt thereof in specific amounts.

According to first aspect of the present invention, there is provided a dyeing agent for cherries which comprises (a-1) a lac dye; (b) alum; (c) L-ascorbic acid and/or a salt thereof; and (d) at least one member selected from the group consisting of phosphoric acid, tartaric acid, citric acid and malic acid and/or a salt thereof in an amount of 0.8~6.0 parts by weight of component (b), 1.0~10.0 parts by weight of component (c) and 3~23.3 parts by weight of component (d) relative to 1 part by weight of component (a-1).

According to second aspect of the present invention, there is provided a dyeing agent for cherries which comprises (a-2) a cochineal dye and a lac dye; (b) alum; (c) L-ascorbic acid and/or a salt thereof; and (d) at least one member selected from the group consisting of phosphoric acid, tartaric acid, citric acid and malic acid and/or a salt thereof in an amount of 0.8~3.6 parts by weight of component (b), 1.0~6.0 parts by weight of component (c) and 3~14 parts by weight of component (d) relative to 1 part by weight of component (a).

According to another aspect of the present invention, there is provided a dyeing solution for dyeing cherries which comprises the foregoing components (a-1) to (d) or (a-2) to (d).

According to a further aspect of the present invention, there is provided a method for dyeing cherries red with the foregoing dyeing solution.

DESCRIPTION OF THE PREFERRED EMBODIMENTS

The present invention will hereinafter be described in more detail.

The cherry-dyeing agent of the present invention may be a simple mixture of the foregoing components (a-1) to (d) or (a-2) to (d) or may be formed into a variety of preparations in any method.

In the present invention, the lac dye is singly used as the component (a-1) of the dyeing agent defined above or is used together with the cochineal dye as the component (a-2). As the cochineal dyes herein usable, there are preferably used those having a color index, as determined according to the following color index-determining method, ranging from 480 to 500.

Color Index-Determining Method for Cochineal Dyes

A cochineal dye is accurately weighed out so that the absorbance to be determined falls within the range of from 0.2 to 0.7, a 0.1 N hydrochloric acid solution is added thereto to give 100 ml of a solution, the resulting solution is, if necessary, subjected to centrifugation, 1 ml thereof is taken and then a 0.1N hydrochloric acid is added to give 100ml of a sample solution to be tested. Using a 0.1N hydrochloric acid solution as a control, the absorbance A of the sample solution contained in a cell having a thickness of 1 cm is determined at a wavelength of about 495 nm at which the dye shows its maximum absorption and the color index is thus determined according to the following equation:

Color Index = $(A \times 100)/$(the amount (g) of the sample used)

In addition, as the lac dyes, there can be used, for instance, those having a color index, as determined according to the following method, ranging from 1490 to 1570.

Color Index-Determining Method for Lac Dyes

The same procedures used in the determination of the color index for cochineal dyes can be used except that a lac dye is dissolved in 20 ml of a 0.1N $Na_2CO_3$ solution and then diluted with water to 100 ml instead of diluting with a 0.1N hydrochloric acid solution to 100 ml. The color index can likewise be obtained according to the same equation defined above.

In the present invention, the lac dye can be used singly in the dyeing agent or can be used together with the cochineal dye in the dyeing agent, but it is preferable to use the combination of the lac dye and the cochineal dye since the uniformity of the dyeing can be further ensured. In case of use of the combination of the lac dye and the cochineal dye, the amounts of the cochineal dye and the lac dye are not restricted to specific ones, but preferably they are simultaneously used in a weight ratio, cochineal dye/lac dye, ranging from 1/0.16 to 1/1.33, more preferably 1/0.16 to 1/1, most preferably 1/0.33 to 1/0.64, or in a ratio of the color index of the cochineal dye to that of the lac dye ranging from 1/0.5 to $\frac{1}{4}$, more preferably 1/0.5 to $\frac{1}{3}$, most preferably 1/1 to $\frac{1}{2}$.

As the component (b), i.e., alum, there may be used, for instance, potassium alum, ammonium alum or burnt alum. Alums are used in the present invention for the purpose of making the red color tone of the resulting dyed cherries more favorable. If the dyeing agent is free of alum, the cherries are dyed unfavorable cinnabar red.

The component (c), i.e., L-ascorbic acid and/or the salt thereof ensure an effect of making the color of the dyed cherries bright red. Examples of the salts of L-ascorbic acid usable in the present invention are a variety of salts thereof such as sodium salt and potassium salt, with sodium salt being particularly preferred.

As the component (d), there can be used, for instance, the aforementioned specific acids and/or salts thereof. Examples of the salts include a variety of salts such as sodium salts and potassium salts.

The component (d) is used in the dyeing agent of the present invention for improving the dyeing affinity of the dye to the cherries to be dyed and for making the red color tone of the dyed cherries more favorable.

In the dyeing agent of the present invention, the foregoing components (a-1) to (d) are used in an amount of 0.8~6.0 parts by weight of component (b), 1.0~10.0 parts by weight of component (c) and 3~23.3 parts by weight of component (d), preferably 0.8~2.3 parts by weight of component (b), 1.8~8.7 parts by weight of component (c) and 7~21.7 parts by weight of component (d) relative to 1 part by weight of component (a-1), while the foregoing components (a-2) to (d) are used in an amount of 0.8~3.6 parts by weight of component (b), 1.0~6.0 parts by weight of component (c) and 3~14 parts by weight of component (d), preferably 0.8~1.4 parts by weight of component (b), 1.8~5.2 parts by weight of component (c) and 7~13 parts by weight of component (d) relative to 1 part by weight of component (a-2).

The dyeing agent of the present invention may optionally comprise a variety of other components in addition to the aforementioned ones. For instance, glucono-delta-lactone (hereinafter referred to as "G.D.L") can be added to the dyeing agent in order to make the pH reduction rate during heating low, to permit the practice of the dyeing operation at a rather high pH and to dye cherries more excellent red color. Moreover, a calcium ion-releasing compound such as a calcium salt is added thereto for the purpose of preventing the softening of the cherries caused during heating, of maintaining appropriate hardness thereof and of effectively maintaining the red color after dyeing. In addition, other additives such as sugar and flavors can likewise be added, in proper amounts, to impart desired taste and perfume to the resulting dyed cherries.

The dyeing solution of the present invention can be prepared in the form of an aqueous solution by, for instance, diluting the foregoing dyeing agent 1250 to 2000 times with water to obtain an aqueous solution containing 0.03 to 0.08% by weight (hereinafter referred to as simply "%") of the component (a-1) or (a-2); 0.064 to 0.18% of the component (b); 0.08 to 0.3% of the component (c); and 0.24 to 0.7% of the component (d). Other diluents such as a solution of sucrose may also be used instead of water. In this respect, it is preferable that the amount of the component (a-2) be adjusted so that the resulting dyeing solution comprises 0.025 to 0.075% of the cochineal dye and 0.015 to 0.038% of the lac dye. Moreover, the resulting dyeing solution preferably comprises 0.122 to 0.182% of trisodium phosphate, 0.087 to 0.240% of L-tartaric acid or a salt thereof and/or 0.095 to 0.155% of citric acid or a salt thereof, as the component (d).

Further, the dyeing solution may comprise up to 0.476% of G.D.L and up to 0.012% (expressed in the amount of Ca) of a calcium ion-releasing compound.

The dyeing agent and the dyeing solution of the present invention are particularly effective for use in dyeing a variety of cherries, in particular fresh cherries. The dyeing agent and solution can be favorably used for dyeing so-called light sweet cherries such as Napoleon Bigarreau, Satoh Nishiki, Corason. de. Paloma, Rainier and Royal Ann. Moreover, the agent and solution can be used for dyeing cherries irrespective of the presence or absence of carpophore. Further, it is sufficient in the present invention that the cherries to be treated with the agent or solution of the present invention are, if necessary, subjected to pretreatments such as simple sorting and/or water washing.

Cherries can be dyed in any manner using the foregoing dyeing solution, but preferably dyed by introducing them into a container together with the dyeing solution, degassing the content of the container, then sealing the container and heating the sealed container. In other words, in this method, it is not necessary to preliminarily immerse cherries in a dyeing solution as in the conventional methods, but the cherries and the dyeing solution can be charged in a container without any pretreatment. Thus, the method is excellent from the viewpoint of high production efficiency and easiness of the packaging operation. Incidentally, The immersion treatments of the cherries can be performed separately or in a container, but it is not preferred because the cherries are possibly cracked during such an immersion treatment. For this reason, the contents of the container is preferably subjected to degassing treatment immediately after filling it with the contents.

The amount of the dyeing solution to be introduced into a container is selected such that the cherries to be dyed are completely immersed in the solution and more specifically it is selected so that the weight ratio of cherries to be treated to the dyeing solution is, for instance, 1:0.59~1:0.8.

The dyeing solution is preferred in such that the pH value of the dyeing solution lowers to the range of 3 to 5, in particular 3.6 to 4.2 upon heating during the practice of the dyeing method as will be explained below. Where the pH of the dyeing solution after heating is lower than the lower limit of the pH mentioned above, dyeing the cherry can be effected, but fading of the cherry occurs during the storage (it becomes grayish red). On the other hand, where the pH of the dyeing solution after heating is higher than the upper limit of the pH mentioned above, there is a trend of lowering the sterilization effect.

The pH of the dyeing solution before heating depends on the acidity of the cherry and it may be sufficient to adjust the pH of the dyeing solution after heating within the pH range mentioned above. In this respect, if the pH of the dyeing solution before heating is in the range of 4 to 9, the pH of the solution after heating would fall within the pH range mentioned above.

When the dyeing solution is charged into a container, the components (a-1), (b), (c) and (d) or (a-2), (b), (c) and (d) may be mixed together in advance to prepare the dyeing solution and then charged in the container, alternatively one or several kinds of the components may be separately charged in the container. In the latter case, it is practically preferable that the lac dye of component (a-1) or the lac dye and the cochineal dye of component (a-2), and alum be separately charged in a container. That is, the dyeing solution is prepared by mixing the aforementioned components and heating the resultant to 90%, in particular, the lac dye of component (a-1) or the lac dye and the cochineal dye of component (a-2), and alum are heated to form dye lake having strong coloring ability. Since the dye lake is easy to precipitate within the pH range of 3 to 5, in particular, 3.6 to 4.2, when the dyeing solution containing such a dye lake is stored in a stored tunk and the like for a long time, lots of precipitates are formed and the thus formed precipitates adhere to cherry, so that the cherry may not be dyed in good color. Such trouble can be solved by charging the components (a-1) or (a-2) and (b) in a container separately.

The containers usable in the method of the present invention are not restricted to specific ones so long as they are heat resistant, water-resistant and air-tightly sealable and examples thereof are cans, pouches of synthetic resins and bottles.

In the foregoing method, the contents (i.e., the dyeing solution and cherries to be treated) of the container are degassed after the introduction thereof. In this respect, there can be used tin can, inside-coated can, tin-free steel can and the like, inside-coated can and tin-free steel can are preferable in view of dyeing properties and less fading during storage.

This degassing treatment is performed for preventing the oxidation and browning of the cherries due to the remaining air (inclusive of the air remaining in the fruit) during heating and storage.

The degassing process can be performed by, for instance, degassing methods by displacement such as a method comprising blowing a gas or steam through the contents of the container, vacuum degassing methods and degassing methods by heating (these methods are particularly effective for degassing the same when the volume of the container is not less than about 3 l). The degassing methods by heating are preferably carried out at a temperature ranging from 80 to 100° C. for 8 to 30 minutes. This is because if the treatment is carried out at a temperature lower than the lower limit for a time shorter than the lower limit, the degassing is insufficient, while if the temperature is higher than the upper limit and the time exceeds the upper limit, the cherries to be treated is not often uniformly heated since the heating is performed at a stationary state.

Incidentally, if the degassing is carried out by the degassing through heating and the dyeing solution used contains G.D.L, it is preferred to add G.D.L after the degassing by heating since it is anticipated that the effect achieved by the addition thereof can be further improved.

In the foregoing method, the container is sealed after the degassing and then heated. When the degassing is carried out by heating, the heating after the degassing is preferably performed at a temperature ranging from 85° to 99° C. for 15 to 60 minutes. If these heating conditions are lower than the corresponding lower limits respectively, the cherries are dyed insufficiently, while if the heating is performed at conditions which exceed the corresponding upper limits respectively, the taste of the cherries treated is certainly impaired due to the superheating and the texture thereof is likewise excessively softened.

On the other hand, when the degassing is carried out by the methods other than the degassing through heating, the heating after the degassing is preferably performed at a temperature ranging from 80 to 95° C. for 20 to 120 minutes. For instance, the heating is carried out at 80° C. for about 60 to 120 minutes or at 95° C. for about 20 to 60 minutes.

According to the present invention, there are provided a dyeing agent and a dyeing solution as well as a method for uniformly dyeing cherries red approximately identical with that of the natural fruit. Thus, according to the present invention, cherries can be dyed in high efficiency through simple processes, i.e., without using a multistage immersion treatment. Moreover, the present invention makes it possible to provide cherries whose texture is not softened, which are sufficiently hard and tight and which exhibit favorable taste of cherries.

The present invention will hereinafter be explained in more detail with reference to the following non-limitative working Examples and Comparative Examples.

EXAMPLE 1

An amount of 10.6 kg of cherry was charged in a tin-free steel can together with 8.4 kg of each dyeing solution having each corresponding composition as shown in the following Table-1, then the contents of the container was degassed by heating to 90° C. for 25 minutes, 27.7 g of G.D.L was added thereto, thereafter the container was sealed and heated to 90° C. for 20 minutes to thus complete each dyeing treatment.

In the following Table-1, the numerical value represents "%" and the term "balance" means the amount of the sucrose solution required for making the sum of the amounts of the components 100%.

TABLE 1

| Component | Present Invention | | Comparative Example | | |
|---|---|---|---|---|---|
| | 1 | 2 | 1 | 2 | 3 |
| cochineal dye | 0.045 | 0.045 | 0.045 | 0.045 | 0.045 |
| lac dye | 0.015 | 0.015 | 0.015 | 0.015 | 0.015 |
| alum | 0.12 | 0.12 | 0 | 0.12 | 0.12 |
| sodium L-ascorbate | 0.95 | 0.95 | 0.95 | 0 | 0.95 |
| trisodium citrate | 0.12 | 0 | 0.12 | 0.12 | 0 |
| trisodium phosphate (crystal) | 0.15 | 0.39 | 0.15 | 0.15 | 0 |
| disodium L-tartrate | 0.12 | 0 | 0.12 | 0.12 | 0 |
| calcium lactate | 0.03 | 0.03 | 0.03 | 0.03 | 0.03 |
| flavor | 0.20 | 0.20 | 0.20 | 0.20 | 0.20 |
| sucrose solution (Brix: 30) | balance | balance | balance | balance | balance |

The cherries treated with the dyeing solution of the present invention (No. 1) were dyed clear bright red which was quite identical with the red color of the natural cherries.

In addition, the cherries treated with the dyeing solution of the present invention (No. 2) were also dyed clear bright red.

On the other hand, when the cherries were treated with the dyeing solution of Comparative Example 1, the coloration thereof was insufficient and they were dyed cinnabar red. The cherries treated with the dyeing solution of Comparative Example 2 were dyed dark red and they caused browning during storage. Further, when the cherries were treated with the dyeing solution of Comparative Example 3, the coloration thereof was insufficient and they were dyed dull cinnabar red.

EXAMPLE 2

This Example was conducted in the same manner as in Example 1 except that the formulations set out in Table 1 were replaced by those set out in Table 2, and therefore, the same results as those of Example 1 were obtained.

TABLE 2

| Component | Present Invention | | Comparative Example | | |
|---|---|---|---|---|---|
| | 1 | 2 | 1 | 2 | 3 |
| cochineal dye | 0.045 | 0.045 | 0.045 | 0.045 | 0.045 |
| lac dye | 0.015 | 0.015 | 0.015 | 0.015 | 0.015 |
| burnt alum | 0.67 | 0.67 | 0 | 0.67 | 0.67 |
| L-ascorbic acid | 1.35 | 1.35 | 1.35 | 0 | 1.35 |
| citric acid (crystal) | 0.56 | 0 | 0.56 | 0.56 | 0 |
| trisodium phosphate (crystal) | 1.50 | 1.50 | 1.50 | 1.50 | 0 |
| disodium L-tartrate | 0.20 | 0 | 0.20 | 0.20 | 0 |
| calcium lactate | 0.37 | 0.37 | 0.37 | 0.37 | 0.37 |
| flavor | 1.70 | 1.70 | 1.70 | 1.70 | 1.70 |
| sucrose solution (Brix: 30) | balance | balance | balance | balance | balance |
| pH after heating | 3.90 | 3.90 | 4.18 | 4.00 | 3.62 |

Example 3

An amount of 10.6 kg of cherry was charged in an inside-coated can together with 8.4 kg of dyeing solution containing 0.03% of lac dye, 0.12% of alum, 0.95% of sodium L-ascorbate, 0.12 % of trisodium citrate, 0.15 % of trisodium phosphate, 0.12% of disodium L-tartrate, 0.03% of calcium lactate, 0.20 wt % of flavor and balance of sucrose solution (Brix: 30), degassed by heating to 90° C. for 25 minutes, 27.7 g of G.D.L was added thereto, thereafter the can was sealed and heated to 90° C. for 20 minutes to thus complete each dyeing treatment. As a result, there were obtained cherries having good color.

What is claimed is:

1. A dyeing agent for dyeing cherries comprising (a-1) a lac dye; (b) alum; (c) L-ascorbic acid, a salt of L-ascorbic acid or a mixture thereof; and (d) at least one member selected from the group consisting of phosphoric acid, tartaric acid, citric acid, malic acid and salts thereof in an amount of 0.8~6.0 parts by weight of component (b), 1.0~10.0 parts by weight of component (c) and 3~23.3 parts by weight of component (d) relative to 1 part by weight of component (a-1).

2. A dyeing agent for dyeing cherries comprising (a-2) a cochineal dye and a lac dye; (b) alum; (c) L-ascorbic acid, a salt of L-ascorbic acid or a mixture thereof and (d) at least one member selected from the group consisting of phosphoric acid, tartaric acid, citric acid, malic acid and salts thereof in an amount of 0.8~3.6 parts by weight of component (b), 1.0~6.0 parts by weight of component (c) and 3~14 parts by weight of component (d) relative to 1 part by weight of component (a-2).

3. The dyeing agent of claim 2 wherein the cochineal dye is selected from those having a color index ranging from 480 to 500.

4. The dyeing agent of claim 2 wherein the lac dye is selected from those having a color index ranging from 1490 to 1570.

5. The dyeing agent of claim 2 wherein the ratio of the cochineal dye to the lac dye ranges from 1:0.16 to 1:1.33 expressed in the weight ratio or ranges from 1:0.5 to 1:4 expressed in the color index ratio.

6. The dyeing agent of claim 2 wherein the components (a-2) to (d) are in an amount of 0.8~1.4 parts by-weight of component (b), 1.8~5.2 parts by weight of component (c) and 7~13 parts by weight of component (d) relative to 1 part by weight of component (a-2).

7. The dyeing agent of claim 2 further comprising glucono-delta-lactone, a calcium ion-releasing compound, sugar, a flavor or a mixture thereof.

8. A dyeing solution comprising (a) 0.03 to 0.08% by weight of a lac dye or a combination of a lac dye and a cochineal dye; (b) 0.064 to 0.18% by weight of alum; (c) 0.08 to 0.3% by weight of L-ascorbic acid, a salt of L-ascorbic acid or a mixture thereof; and (d) 0.24 to 0.7% by weight of at least one member selected from the group consisting of phosphoric acid, tartaric acid, citric acid, malic acid and salts thereof.

9. The dyeing solution of claim 8 wherein it comprises, as the component (a), 0.025 to 0.075% by weight of the cochineal dye and 0.015 to 0.038% by weight of the lac dye.

10. The dyeing solution of claim 8 wherein it comprises, as the component (d), 0.122 to 0.182% by weight of trisodium phosphate, 0.087 to 0.240% by weight of L-tartaric acid or a salt thereof, 0.095 to 0.155% by weight of citric acid or a salt thereof, or a mixture thereof.

11. The dyeing solution of claim 8 wherein it further comprises up to 0.476% by weight of glucono-delta--lactone.

12. The dyeing solution of claim 8 wherein it further comprises up to 0.012%, expressed in an amount of Ca, by weight of a calcium ion-releasing compound.

13. The dyeing solution of claim 8 wherein it has a pH value ranging from 4 to 9.

* * * * *